United States Patent
Chiang

(10) Patent No.: US 11,151,400 B2
(45) Date of Patent: Oct. 19, 2021

(54) FINGERPRINT ENROLLMENT METHOD AND ELECTRONIC DEVICE FOR GENERATING A FINGERPRINT ENROLLMENT TEMPLATE

(71) Applicant: Egis Technology Inc., Taipei (TW)

(72) Inventor: Yuan-Lin Chiang, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 91 days.

(21) Appl. No.: 16/551,664

(22) Filed: Aug. 26, 2019

(65) Prior Publication Data
US 2020/0074201 A1 Mar. 5, 2020

Related U.S. Application Data

(60) Provisional application No. 62/727,055, filed on Sep. 5, 2018.

(30) Foreign Application Priority Data
Aug. 2, 2019 (CN) .......................... 201910711469.9

(51) Int. Cl.
G06K 9/00 (2006.01)
(52) U.S. Cl.
CPC ..... G06K 9/00926 (2013.01); G06K 9/00013 (2013.01); G06K 9/00919 (2013.01)
(58) Field of Classification Search
CPC ........... G06K 9/00926; G06K 9/00013; G06K 9/00919; G06K 9/00087; G06K 9/00026; G06K 9/00067
See application file for complete search history.

(56) References Cited

U.S. PATENT DOCUMENTS 9,521,314 B2 * 12/2016 Setterberg .......... G06K 9/00926
9,665,785 B2   5/2017 Han et al.
(Continued)

FOREIGN PATENT DOCUMENTS

CN    105528576 A    4/2016
CN    105718852 A    6/2016
(Continued)

OTHER PUBLICATIONS

China Patent Office, Office Action, Patent Application No. 201910711469.9, dated Jul. 1, 2021, China.

*Primary Examiner* — Siamak Harandi

(57) ABSTRACT

A fingerprint enrollment method applied to generate a fingerprint enrollment template includes the steps of obtaining a fingerprint image; obtaining a group of features corresponding to the fingerprint image; determining whether there being temporary enrollment data; when there being no temporary enrollment data, generating temporary enrollment data according to the group of features and displaying a feature image corresponding to the group of features on a display interface; when there being temporary enrollment data, according to a relative-position relationship between the group of features and the temporary enrollment data, displaying the feature image corresponding to the group of features on the display interface, and incorporating the group of features into the temporary enrollment data; and determining whether the temporary enrollment data satisfying with an enrollment completion condition.

20 Claims, 10 Drawing Sheets

(56) References Cited

U.S. PATENT DOCUMENTS

| | | | |
|---|---|---|---|
| 2006/0018523 A1* | 1/2006 | Saitoh | G06K 9/001 382/124 |
| 2007/0036400 A1* | 2/2007 | Watanabe | G06K 9/001 382/124 |
| 2007/0154072 A1 | 7/2007 | Taraba et al. | |
| 2007/0220274 A1* | 9/2007 | Jensen | H04L 9/3234 713/186 |
| 2016/0253548 A1* | 9/2016 | Dos Remedios | G06K 9/6292 382/125 |
| 2017/0091523 A1 | 3/2017 | Chen et al. | |
| 2018/0137332 A1* | 5/2018 | Andersen | G06K 9/00087 |
| 2019/0228206 A1* | 7/2019 | Baudot | G06K 9/0004 |

FOREIGN PATENT DOCUMENTS

| | | |
|---|---|---|
| CN | 106485190 A | 3/2017 |
| TW | I522835 | 2/2016 |
| TW | I634475 | 9/2018 |
| WO | WO0068873 A1 | 11/2000 |

\* cited by examiner

FINGERPRINT ENROLLMENT METHOD AND ELECTRONIC DEVICE FOR GENERATING A FINGERPRINT ENROLLMENT TEMPLATE

CROSS REFERENCE TO RELATED APPLICATIONS

This application claims priority of Provisional Patent Application No. 62/727,055 filed on Sep. 5, 2018 and CN Patent Application No. 201910711469.9 filed on Aug. 2, 2019, the entirety of which are incorporated by reference herein.

BACKGROUND OF THE INVENTION

Field of the Invention

The invention generally relates to fingerprint enrollment technology, and more particularly, to fingerprint enrollment technology for guiding a user during the process of fingerprint enrollment via a display interface.

Description of the Related Art

More attention is being paid to fingerprint-recognition technology as biometric recognition technology progresses. Fingerprints are unique and never-changing, and each person has multiple fingers, whose prints may be used for identity recognition. In addition, fingerprints can be obtained easily using fingerprint sensors. Therefore, fingerprint recognition can provide increased security and convenience, and financial security and confidential data can be better protected.

Traditionally, using a fingerprint sensor with small area, a user may enroll his or her fingerprint by putting his or her finger on the fingerprint sensor to obtain the fingerprint data for fingerprint recognition. Because the sensing area of the fingerprint sensor is smaller than the area of the finger, e.g. the sensing area is 10 mm×4 mm, the user needs to put his or her finger on the fingerprint sensor many times to complete fingerprint enrollment. In addition, when the user puts his or her finger on the fingerprint sensor to enroll his or her fingerprint, the user may habitually put a particular part of his or her finger on the fingerprint sensor. Therefore, even if the user puts his or her finger on the fingerprint sensor many times, the coverage of the fingerprint enrollment template may be insufficient, and as a result, the failure rate of fingerprint recognition will increase.

BRIEF SUMMARY OF THE INVENTION

A fingerprint enrollment method and an electronic device for guiding the user during the fingerprint enrollment process using a display interface are provided.

An embodiment of the invention provides a fingerprint enrollment method. The fingerprint enrollment method is applied to generate a fingerprint enrollment template. The fingerprint enrollment method comprises the steps of obtaining a fingerprint image; obtaining a group of features corresponding to the fingerprint image; determining whether there being temporary enrollment data; when there being no temporary enrollment data, generating temporary enrollment data according to the group of features and displaying a feature image corresponding to the group of features on a display interface; when there being temporary enrollment data, according to a relative-position relationship between the group of features and the temporary enrollment data, displaying the feature image corresponding to the group of features on the display interface, and incorporating the group of features into the temporary enrollment data; determining whether the temporary enrollment data satisfying with an enrollment completion condition; and when the temporary enrollment data satisfying with the enrollment completion condition, storing the temporary enrollment data for use as the fingerprint enrollment template to complete fingerprint enrollment.

An embodiment of the invention provides an electronic device. The electronic device is applied to generate a fingerprint enrollment template. The electronic device comprises a display device, a fingerprint sensor, a processing device and a storage device. The display device comprises a display interface. The fingerprint sensor obtains a plurality of fingerprint images. The processing device is coupled to the display device and the fingerprint sensor. The processing device obtains a plurality of groups of features corresponding to the plurality of fingerprint images and according to the plurality of groups of features, generates temporary enrollment data. The storage device stores the fingerprint enrollment template. The processing device performs the following steps: obtaining a fingerprint image; obtaining a group of features corresponding to the fingerprint image; determining whether there being temporary enrollment data; when there being no temporary enrollment data, generating temporary enrollment data according to the group of features and displaying a feature image corresponding to the group of features on the display interface; when there being temporary enrollment data, according to a relative-position relationship between the group of features and the temporary enrollment data, displaying the feature image corresponding to the group of features on the display interface, and incorporating the group of features into the temporary enrollment data; determining whether the temporary enrollment data satisfying with an enrollment completion condition; and when the temporary enrollment data satisfying with the enrollment completion condition, storing the temporary enrollment data for use as the fingerprint enrollment template to complete fingerprint enrollment.

Other aspects and features of the invention will become apparent to those with ordinary skill in the art upon review of the following descriptions of specific embodiments of fingerprint enrollment methods and electronic devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
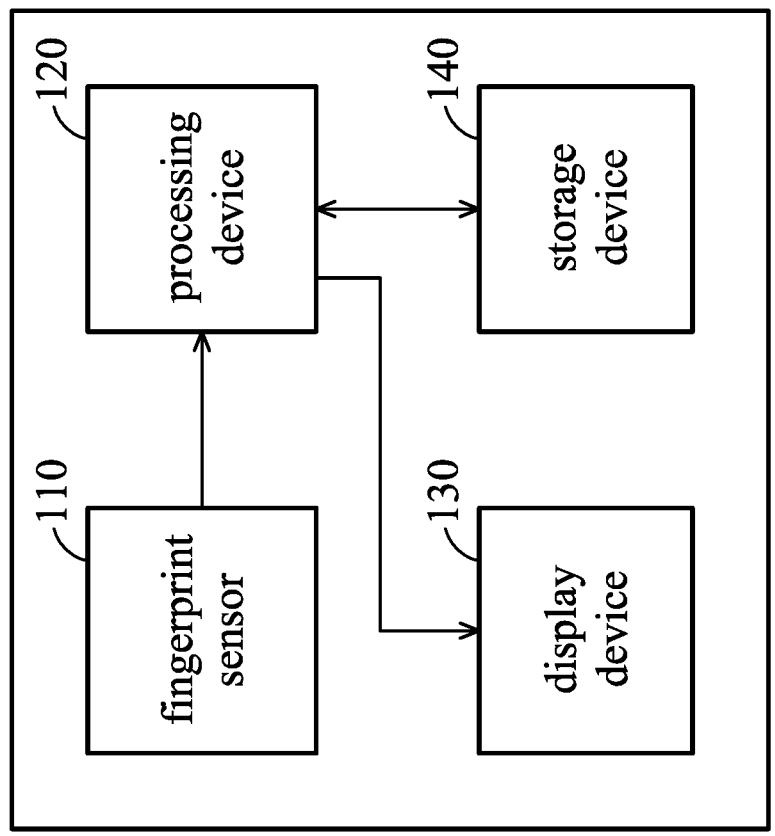
FIG. 1 is a block diagram of an electronic device 100 according to an embodiment of the invention.

FIG. 1 is a block diagram of an electronic device 100 according to an embodiment of the invention. In an embodiment of the invention, the electronic device 100 is an electronic device with a fingerprint recognition function, e.g. a mobile phone, a smartphone, a tablet computer, a notebook computer, and so on. As shown in FIG. 1, the electronic device 100 comprises a fingerprint sensor 110, a processing device 120, a display device 130 and a storage device. FIG. 1 presents a simplified block diagram in which only the elements relevant to the invention are shown. However, the invention should not be limited to what is shown in FIG. 1.

According to the embodiments of the invention, the fingerprint sensor 110 may be a fingerprint sensor with small area. Namely, the sensing area of the fingerprint sensor 110 is smaller than the area of finger. For example, the sensing area of the fingerprint sensor 110 is 10 mm×4 mm, 6 mm×6 mm, or 4 mm×3.2 mm. Therefore, when the user registers the fingerprint enrollment template for fingerprint recognition, the user needs to put his or her finger on the fingerprint sensor 110 many times to obtain a more complete fingerprint enrollment template (or fingerprint enrollment image) for fingerprint recognition. That is to say, the area of the fingerprint enrollment template (or fingerprint enrollment image) is larger than the sensing area of the fingerprint sensor 110.

According to an embodiment of the invention, the storage device 140 may comprise a volatile memory to store the temporary enrollment data, and comprise a non-volatile memory to store the final fingerprint enrollment template. According to an embodiment of the invention, the temporary enrollment data may comprise at least one feature group. According to an embodiment of the invention, the final fingerprint enrollment template may comprise at least one feature group.

According to an embodiment of the invention, when the user wants to enroll his or her fingerprint for fingerprint recognition, the user may put his or her finger on the fingerprint sensor 110 of the electronic device 100, and the fingerprint sensor 110 may scan the user's fingerprint to obtain a fingerprint image. Then, the processing device 120 may obtain a group of features corresponding to the fingerprint image. Then, the processing device 120 may determine whether there is temporary enrollment data in the storage device 140.

According to an embodiment of the invention, when there is no temporary enrollment data in the storage device 140 (i.e. the fingerprint sensor 110 obtains the fingerprint image of the user the first time), the processing device 120 may generate temporary enrollment data (i.e. the group of features is a first part of the temporary enrollment data) according to the group of features (e.g. a first group of features) corresponding to the fingerprint image and a feature image corresponding to the group of features is displayed on the display interface of the display device 130. Specifically, the processing device 120 may take the group of features to be a first feature group of the temporary enrollment data, and displays the feature image corresponding to the first feature group (i.e. the first group of features) on a first display area (e.g. a first display area $A_1$ as shown in FIG. 3A) of the display interface of the display device 130.

Figure 3B:
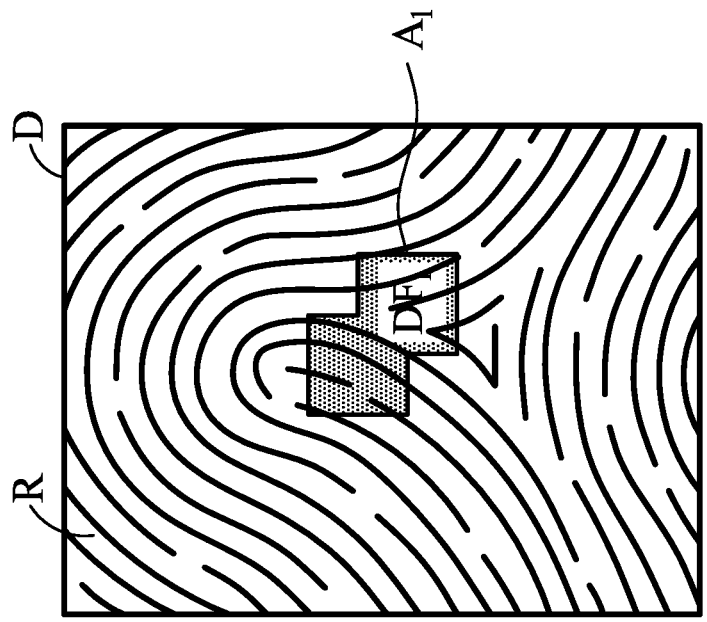
FIGS. 3A-3G are schematic diagrams of generating the fingerprint enrollment template and displaying the enrollment process according to an embodiment of the invention.
Figure 3A:
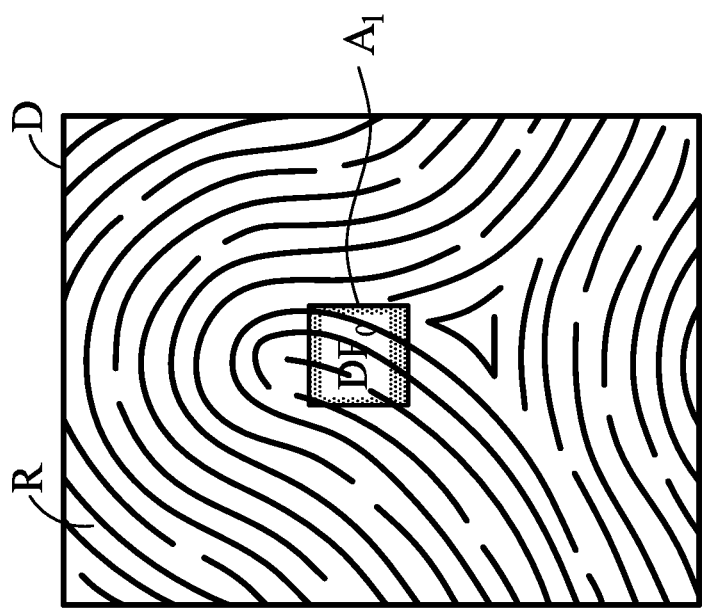

In addition, according to an embodiment of the invention, the display interface may comprise a reference fingerprint image (e.g. the reference fingerprint image R as shown in FIGS. 3A-3G), and the feature image is displayed on the reference fingerprint image. However, it should be noted that the reference fingerprint image is a fingerprint pattern shown on the display interface for reference, not a real fingerprint of the user. According to an embodiment of the invention, the feature image corresponding to the first feature group is displayed on a first display area (e.g. the first display area $A_1$ as shown in FIG. 3A) of the display interface, and the first display area (i.e. a display area includes the feature image corresponding to the first group of features) is displayed on a central area of the reference fingerprint image.

According to an embodiment of the invention, when there is temporary enrollment data in the storage device 140 (i.e. the fingerprint sensor 110 has obtained at least one fingerprint image of the user previously), the processing device 120 may compare the group of features (e.g. a second group of features) with the feature group (e.g. the first feature group) of the temporary enrollment data to determine whether the group of features matches the feature group of the temporary enrollment data. It should be noted that, in order to illustrate simply, in the embodiment, the temporary enrollment data comprises a first feature group initially, but the invention should not be limited thereto. After the comparison, when the group of features matches the first feature group of the temporary enrollment data, according to the relative-position relationship between the group of features (e.g. a second group of features) and the first feature group, the processing device 120 may display the feature image corresponding to the group of features on the first display area of the display interface of the display device 130. Then, the processing device 120 may incorporate the group of features into the first feature group of the temporary enrollment data. Specifically, when the group of features matches the temporary enrollment data (i.e. the group of features overlaps with the first feature group of the temporary enrollment data. That is to say, the same features are present in the group of features and the first feature group, and the processing device 120 may obtain relative-position information between the group of features and the first feature group of the temporary enrollment data (i.e. the shift information of the same features which are repeatedly present in the group of features and the first feature group), and the processing device 120 may display the feature image corresponding to the group of features on the first display area (e.g. the first display area $A_1$ as shown in FIG. 3B) of the display interface of the display device 130 according to the relative-position relationship between the group of features and the first feature group.

When the group of features does not match the first feature group of the temporary enrollment data, the processing device 120 may take the group of features to be a second feature group of the temporary enrollment data. In addition, the processing device 120 may display the feature image corresponding to the second feature group on a second display area of the display interface of the display device 130. Specifically, when the group of features does not match the first feature group of the temporary enrollment data (i.e.

the group of features does not overlap with the first feature group of the temporary enrollment data. That is to say, the group of features and the first feature group do not comprise the same features), the processing device 120 may select a blank area (the area excluding the first display area) on the display interface of the display device 130 to be the second display area. That is to say, the first display area does not overlap the second display area.

Figure 2:
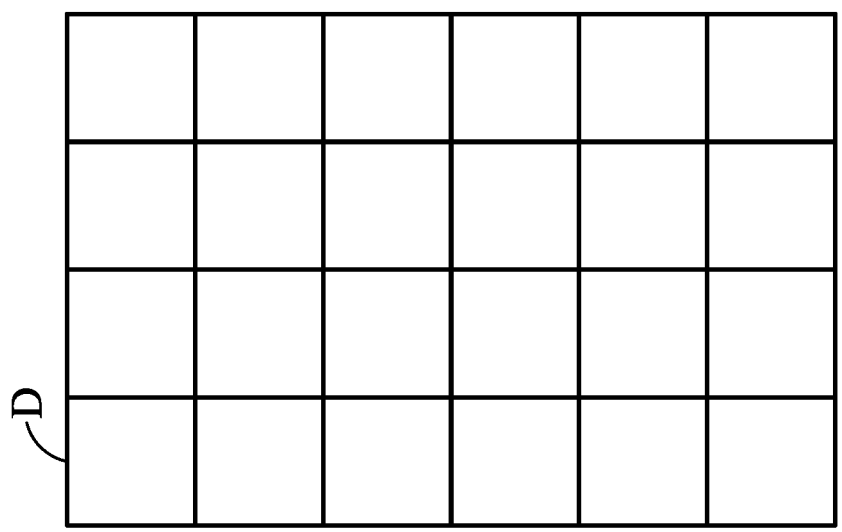
FIG. 2 is a schematic diagram illustrating a display interface divided into a plurality of blocks according to an embodiment of the invention.

According to an embodiment of the invention, the processing device 120 may divide the display interface into a plurality of blocks. As shown in FIG. 2, the display interface D is divided into a plurality of blocks. According to an embodiment of the invention, when the group of features does not match the first feature group of the temporary enrollment data, the processing device 120 may select one block from the blocks which do not comprise the first display area to be the second display area to display the feature image corresponding to the second feature group.

According to another embodiment of the invention, when the group of features does not match the first feature group of the temporary enrollment data, the processing device 120 may select a block which is the furthest from the first display area to be the second display area. According to another embodiment of the invention, if a new group of features does not overlap with any feature group of the temporary enrollment data, the processing device 120 may display the feature image corresponding to the new group of features on the block which has the lowest display density of feature image on the display interface.

After the group of features is incorporated, the processing device 120 may determine whether the current temporary enrollment data satisfies with an enrollment completion condition. When the current temporary enrollment data satisfies with an enrollment completion condition, the processing device 120 may take the current temporary enrollment data to be the final fingerprint enrollment template and terminate the fingerprint enrollment process. When the current temporary enrollment data does not satisfy with an enrollment completion condition, the user may put his or her finger on the fingerprint sensor 110 of the electronic device 100 again, and the fingerprint sensor 110 may scan the user's fingerprint to obtain another fingerprint image. Then, the processing device 120 may obtain another group of features according to the current fingerprint image. Then, the processing device 120 may compare the current group of features with the feature groups of the temporary enrollment data.

According to an embodiment of the invention, the enrollment completion condition may be that the number of the features included in the temporary enrollment data, the data quantity, the coverage area, the width or the height of the temporary enrollment data is greater than a predetermined threshold.

According to an embodiment of the invention, when the current group of features (e.g. a third group of features) matches the first feature group and also matches the second feature group, the processing device 120 may display the feature image corresponding to the current group of features on the first display area of the display interface of the display device 130 according to a first relative-position relationship between the current group of features and the first feature group, and the processing device 120 may incorporate the second display area into the first display area according to a second relative-position relationship between the current group of features and the second feature group. Then, the processing device 120 may incorporate the current group of features (e.g. a third group of features) into the second feature group, and then incorporate the second feature group into the first feature group. That is to say, the same features (a first group of repeated features) are present in the first feature group and in the current group of features. Therefore, the processing device 120 can use the first group of repeated features to find the first relative-position relationship between the current group of features and the first feature group, and according to the first relative-position relationship, incorporate the current group of features into the first feature group. In addition, the same features (a second group of repeated features) are present in the second feature group and the current group of features. Therefore, the processing device 120 can use the second group of repeated features to find the second relative-position relationship between the current group of features and the second feature group, and according to the second relative-position relationship, incorporate the second feature group into the first feature group which the current group of features has been incorporated into. Then, the processing device 120 may determine whether the current temporary enrollment data satisfies with the enrollment completion condition.

According to another embodiment of the invention, when the current group of features (e.g. the third group of features) matches the first feature group and the second feature group, the processing device 120 may display the feature image that corresponds to the current group of features on the first display area according to the relative-position relationship between the current group of features and the first feature group, and the processing device 120 may display the feature image corresponding to the current group of features on the second display area according to the relative-position relationship between the current group of features and the second feature group. In addition, the processing device 120 may incorporate the current group of features into the first feature group and also incorporate the current group of features into the second feature group. Then, according to the relative-position relationship between the first feature group and the second feature group, the processing device 120 may incorporate the second display area into the first display area, and the processing device 120 may incorporate the second feature group into the first feature group.

When the current group of features does not match the first feature group and does not match the second feature group, the processing device 120 may take the current group of features to be a third feature group of the temporary enrollment data. In addition, the processing device 120 may select a blank area (excluding the first display area and the second display area) to be a third display area and display the feature image corresponding to the current group of features thereon. That is to say, the first display area, the second display area and the third display area do not overlap each other. Then, the processing device 120 may determine whether the current temporary enrollment data satisfies with the enrollment completion condition.

If the current temporary enrollment data does not satisfy with the enrollment completion condition, the processing device 120 may display a notice message on the display interface of the display device 130 to request the user to put his or her finger on the fingerprint sensor 110 of the electronic device 100 to obtain a new fingerprint image. If the current temporary enrollment data satisfies with the enrollment completion condition, the processing device 120 may take (store) the current temporary enrollment data to be the final fingerprint enrollment template and terminate the fingerprint enrollment process.

In the embodiments of the invention, during the fingerprint enrollment process, when the user put his or her finger on the fingerprint sensor 110 of the electronic device 100, the user can adjust the portion of his or her finger putting on the fingerprint sensor 110 based on the enrollment progress information on the display interface, so as to increase the coverage of the fingerprint enrollment template obtained by the electronic device 100. For example, if the user finds that the display areas displayed on the display interface are extending slowly (i.e. the total area of the display areas is increasing slowly), it means that the user may substantially repeatedly put a particular part of his or her finger on the fingerprint sensor 110. Therefore, the user can adjust the portion of his or her finger putting on the fingerprint sensor 110 based on the enrollment progress information on the display interface, so as to increase the coverage of the fingerprint enrollment template.

FIGS. 3A-3G are taken as an example for illustration below. FIGS. 3A-3G are schematic diagrams of generating the fingerprint enrollment template and displaying the enrollment process according to an embodiment of the invention. As shown in FIGS. 3A-3G, the display interface D may display a reference fingerprint image R. It should be noted that FIGS. 3A-3G are only an example to illustrate the embodiments of the invention, but the invention should not be limited thereto.

In FIG. 3A, the processing device 120 may take a first group of features $F_0$ of a first obtained fingerprint image to be a first feature group $G_0$ of the temporary enrollment data. That is to say, the current temporary enrollment data comprises the first feature group $G_0$. In addition, the processing device 120 may display a first feature image $DF_0$ corresponding to the first group of features $F_0$ on a first display area $A_1$ of the reference fingerprint image R. As shown in FIG. 3A, the first feature image $DF_0$ is displayed on the central position of the reference fingerprint image R. Then, the processing device 120 may determine whether the current temporary enrollment data satisfies with the enrollment completion condition. If the current temporary enrollment data does not satisfy with the enrollment completion condition, the processing device 120 may request the user to put his or her finger on the fingerprint sensor 110 again to generate a second group of features $F_1$.

The operations corresponding to FIG. 3A may be represented by the equations below:

$$E_0=\emptyset, r=\text{MatchEnroll}(E_0, F_0)$$

$$r=0,$$

wherein $E_0$ is the data comprised in the temporary enrollment data before the operations corresponding to FIG. 3A, r is a matching score between the temporary enrollment data $E_0$ (no data) and the first group of features $F_0$.

After the second group of features $F_1$ is generated, the processing device 120 may compare the second group of features $F_1$ with the first feature group $G_0$. As shown in FIG. 3B, when the processing device 120 determines that the second group of features $F_1$ matches the first feature group $G_0$, the processing device 120 may display a second feature image $DF_1$ corresponding to the second group of features $F_1$ on the first display area $A_1$ of the reference fingerprint image R according to the relative-position relationship between the second group of features $F_1$ and the first feature group $G_0$. That is to say, the current first display area $A_1$ may comprise the first feature image $DF_0$ and the second feature image $DF_1$. In addition, the processing device 120 may incorporate the second group of features $F_1$ into the first feature group $G_0$. Then, the processing device 120 may determine whether the current temporary enrollment data satisfies with the enrollment completion condition. If the current temporary enrollment data does not satisfy with the enrollment completion condition, the processing device 120 may request the user to put his or her finger on the fingerprint sensor 110 again to generate a third group of features $F_2$.

The operations corresponding to FIG. 3B may be represented by the equations below:

$$E_1=[G_0], r=\text{MatchEnroll}(E_1, F_1)$$

$$r=6\ 5\ 0, dx=1\ 0, dy=8,$$

$$\text{Union Display}(A_1, DF_1)$$

$$G_0=G_0 \cup F_1,$$

wherein $E_1$ is the data comprised in the temporary enrollment data before the operations corresponding to FIG. 3B, r is a matching score between the second group of features $F_1$ and the first feature group $G_0$, dx and dy represent the relative-position relationship between the second group of features $F_1$ and the first feature group $G_0$, Union Display $(A_1, DF_1)$ is a union set of the first display area $A_1$ and the second feature image $DF_1$ (i.e. the second feature image $DF_1$ is displayed in the first display area $A_1$), and $G_0=G_0 \cup F_1$ indicates that the second group of features $F_1$ is incorporated into the first feature group $G_0$.

Figure 3D:
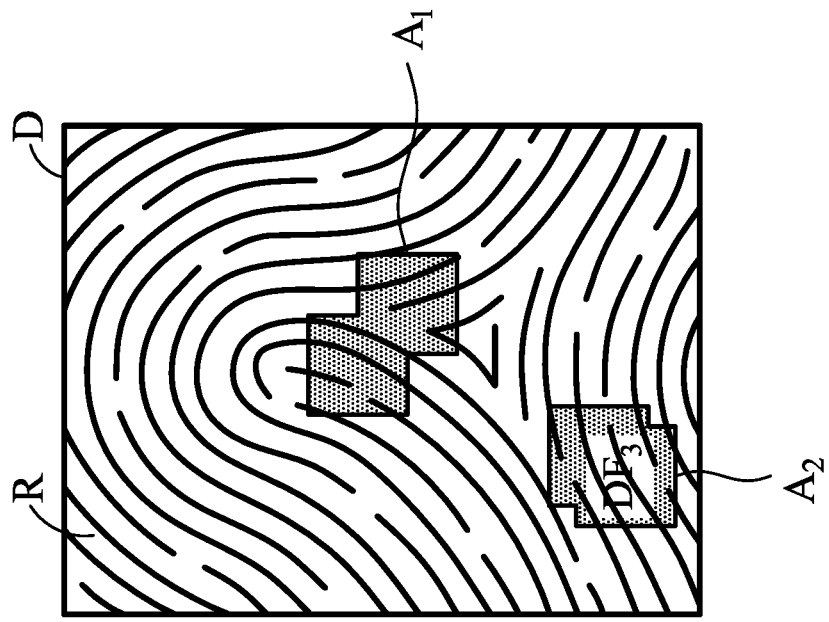
Figure 3C:
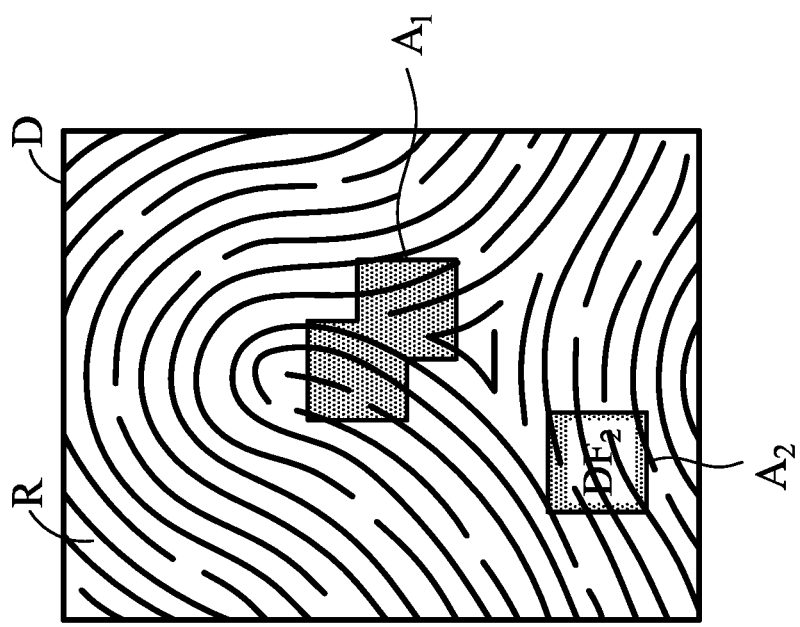

After a third group of features $F_2$ is generated, the processing device 10 may compare the third group of features $F_2$ with the first feature group $G_0$. As shown in FIG. 3C, when the processing device 120 determines that the third group of features $F_2$ does not match the first feature group $G_0$, the processing device 120 may take the third group of features $F_2$ to be a second feature group $G_1$ of the temporary enrollment data. The processing device 120 may select a blank area (excluding the first display area $A_1$) on the reference fingerprint image R to display the third feature image $DF_2$ corresponding to the second feature group $G_1$ (i.e. the third group of features $F_2$) to form a second display area $A_2$. Then, the processing device 120 may determine whether the current temporary enrollment data satisfies with the enrollment completion condition. If the current temporary enrollment data does not satisfy with the enrollment completion condition, the processing device 120 may request the user to put his or her finger on the fingerprint sensor 110 again to generate a fourth group of features $F_3$.

The operations corresponding to FIG. 3C may be represented by the equations below:

$$E_2=[G_0] r=\text{MatchEnroll}(E_2, F_2)$$

$$r=0$$

wherein $E_2$ is the data comprised in the temporary enrollment data before the operations corresponding to FIG. 3C, r is a matching score between the third group of features $F_2$ and the first feature group $G_0$.

After the fourth group of features $F_3$ is generated, the processing device 120 may compare the fourth group of features $F_3$ with the first feature group $G_0$ and compare the fourth group of features $F_3$ with the second feature group $G_1$. As shown in FIG. 3D, when the processing device 120 determines that the fourth group of features $F_3$ does not match the first feature group $G_0$ and the fourth group of features $F_3$ matches the second feature group $G_1$, the processing device 120 may display a fourth feature image $DF_3$ corresponding to the fourth group of features $F_3$ on the second display area $A_2$ of the reference fingerprint image R according to the relative-position relationship between the fourth group of features $F_3$ and the second feature group $G_1$.

That is to say, the current second display area $A_2$ may comprise the third feature image $DF_2$ and the fourth feature image $DF_3$. In addition, the processing device 120 may incorporate the fourth group of features $F_3$ into the second feature group $G_1$. Then, the processing device 120 may determine whether the current temporary enrollment data satisfies with the enrollment completion condition. If the current temporary enrollment data does not satisfy with the enrollment completion condition, the processing device 120 may request the user to put his or her finger on the fingerprint sensor 110 again to generate a fifth group of features $F_4$.

The operations corresponding to FIG. 3D may be represented by the equations below:

$$E_3=[G_0,G_1], r=\text{MatchEnroll}(E_3,F_3)$$

$$r_0=0$$

$$r_1=5\ 2\ 0, dx=-2, dy=5$$

$$\text{Union Display}(A_2, DF_3)$$

$$G_1=G_1 \cup F_3,$$

wherein $E_3$ is the data comprised in the temporary enrollment data before the operations corresponding to FIG. 3D, $r_0$ is a matching score between the fourth group of features $F_3$ and the first feature group $G_0$, $r_1$ is a matching score between the fourth group of features $F_3$ and the second feature group $G_1$, dx and dy represent the relative-position relationship between the fourth group of features $F_3$ and the second feature group $G_1$, Union Display $(A_2, DF_3)$ is a union set of the second display area $A_2$ and the fourth feature image $DF_3$ (i.e. the fourth feature image $DF_3$ is displayed in the second display area $A_2$), and $G_1=G_1 \cup F_3$ indicates that the fourth group of features $F_3$ is incorporated into the second feature group $G_1$.

Figure 3F:
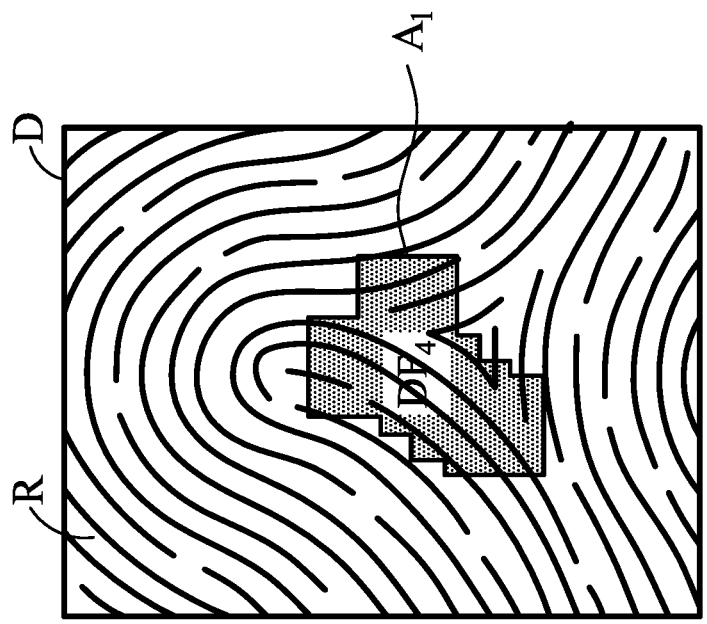
Figure 3E:
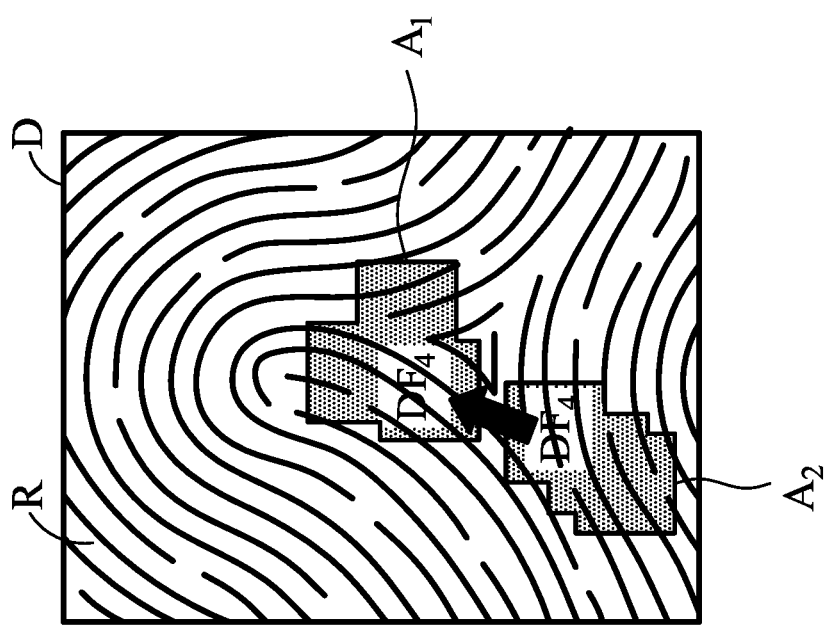

After the fifth group of features $F_4$ is generated, the processing device 120 may compare the fifth group of features $F_4$ with the first feature group $G_0$ and compare the fifth group of features $F_4$ with the second feature group $G_1$. As shown in FIG. 3E, when the processing device 120 determines that the fifth group of features $F_4$ matches the first feature group $G_0$, and that the fifth group of features $F_4$ also matches the second feature group $G_1$, the processing device 120 may display a fifth feature image $DF_4$ corresponding to the fifth group of features $F_4$ on the first display area $A_1$ of the reference fingerprint image R according to the relative-position relationship between the fifth group of features $F_4$ and the first feature group $G_0$ and display the fifth feature image $DF_4$ corresponding to the fifth group of features $F_4$ on the second display area $A_2$ of the reference fingerprint image R according to the relative-position relationship between the fifth group of features $F_4$ and the second feature group $G_1$. That is to say, the current first display area $A_1$ may comprise the first feature image $DF_0$, the second feature image $DF_1$ and the fifth feature image $DF_4$, and the current second display area $A_2$ may comprise the third feature image $DF_2$, the fourth feature image $DF_3$ and the fifth feature image $DF_4$. In addition, the processing device 120 may incorporate the fifth group of features $F_4$ into the second feature group $G_1$ and incorporate the fifth group of features $F_4$ into the first feature group $G_0$. Then, the processing device 120 may determine whether the current temporary enrollment data satisfies with the enrollment completion condition. If the current temporary enrollment data does not satisfy with the enrollment completion condition, the processing device 120 may request the user to put his or her finger on the fingerprint sensor 110 again to generate a sixth group of features $F_5$.

The operations corresponding to FIG. 3E may be represented by the equations below:

$$E_4=[G_0,G_1], r=\text{MatchEnroll}(E_4,F_4)$$

$$r_0=6\ 1\ 0, dx_0=-3, dy_0=1\ 6$$

$$\text{Union Display}(A_1, DF_4)$$

$$r_1=5\ 8\ 0, dx_1=7, dy_1=-5$$

$$\text{Union Display}(A_2, DF_4),$$

wherein $E_4$ is the data comprised in the temporary enrollment data before the operations corresponding to FIG. 3E, $r_0$ is a matching score between the fifth group of features $F_4$ and the first feature group $G_0$, $r_1$ is a matching score between the fifth group of features $F_4$ and the second feature group $G_1$, $dx_0$ and $dy_0$ represent the relative-position relationship between the fifth group of features $F_4$ and the first feature group $G_0$, $dx_1$ and $dy_1$ represent the relative-position relationship between the fifth group of features $F_4$ and the second feature group $G_1$, Union Display $(A_1, DF_4)$ is a union set of the first display area $A_1$ and the fifth feature image $DF_4$ (i.e. the fifth feature image $DF_4$ is displayed on the first display area $A_1$), and Union Display $(A_2, DF_4)$ is a union set of the second display area $A_2$ and the fifth feature image $DF_4$ (i.e. the fifth feature image $DF_4$ is displayed on the second display area $A_2$).

That is to say, the first feature group $G_0$ and the second feature group $G_1$ overlap because of the fifth group of features $F_4$. As shown in FIG. 3F, the processing device 120 may incorporate the second display area $A_2$ into the first display area $A_1$ according to the relative-position relationship between the first feature group $G_0$ and the second feature group $G_1$. That is to say, the current first display area $A_1$ may comprise the first feature image $DF_0$, the second feature image $DF_1$, the third feature image $DF_2$, the fourth feature image $DF_3$ and the fifth feature image $DF_4$. In addition, the processing device 120 may incorporate the second feature group $G_1$ into the first feature group $G_0$.

The operations corresponding to FIG. 3F may be represented by the equations below:

$$r=\text{Match}(G_0 \cup F_4, G_1 \cup F_4)$$

$$r=1\ 2\ 1\ 0, dx=-2\ 1, dy=3\ 0$$

$$G_0=G_0 \cup F_4$$

$$G_1=G_1 \cup F_4$$

$$\text{Bridge Display}(A_1, A_2)$$

$$G_0=G_0 \cup G_1,$$

wherein r is a matching score between the first feature group $G_0$ which the fifth group of features $F_4$ is incorporated into and the second feature group $G_1$ which the fifth group of features $F_4$ is incorporated into, $G_0=G_0 \cup F_4$ indicates that the fifth group of features $F_4$ is incorporated into the first feature group $G_0$, $G_1=G_1 \cup F_4$ indicates that the fifth group of features $F_4$ is incorporated into the second feature group $G_1$, Bridge Display $(A_1, A_2)$ is a union set of the first display area $A_1$ and the second display area $A_2$ (i.e. the second display area $A_2$ is incorporated into the first display area $A_1$), and $G_0=G_0 \cup G_1$ indicates that the second feature group $G_1$ is incorporated into the first feature group $G_0$.

Figure 3G:
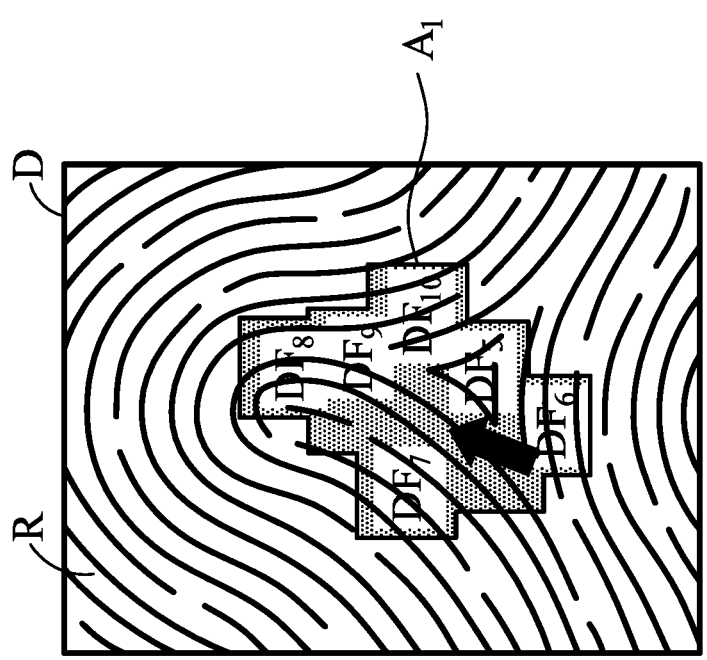

Accordingly, the processing device 120 may obtain and process the sixth group of features $F_5$, the seventh group of features $F_6$, the eighth group of features $F_7$, the ninth group of features $F_8$, the tenth group of features $F_9$ and the eleventh group of features $F_{10}$, and display the sixth feature image $DF_5$ corresponding to the sixth group of features $F_5$, the seventh feature image $DF_6$ corresponding to the seventh group of features $F_6$, the eighth feature image $DF_7$ corresponding to the eighth group of features $F_7$, the ninth feature image $DF_8$ corresponding to the ninth group of features $F_8$, the tenth feature image $DF_9$ corresponding to the tenth group of features $F_9$ and the eleventh feature image $DF_{10}$ corresponding to the eleventh group of features $F_{10}$ on the display device 130. As shown in FIG. 3G, if after the eleventh feature image $DF_{10}$ is displayed, the processing device 120 determines that the current temporary enrollment data satisfies with the enrollment completion condition, the processing device 120 may take the current temporary enrollment data to be the final fingerprint enrollment template and terminate the fingerprint enrollment process.

The operations corresponding to FIG. 3G may be represented by the equations below:

$$E_5 = [G_0], r = \text{MatchEnroll}(E_5, F_5)$$

$$r = 595, dx = 8, dy = 27,$$

$$\text{Union Display}(A_1, DF_5)$$

$$G_0 = G_0 \cup F_5$$

$$\ldots\ .$$

$$\text{Repeat input until } F_{10},$$

wherein $E_5$ is the data comprised in the temporary enrollment data before the operations corresponding to FIG. 3G, r is a matching score between the sixth group of features $F_5$ and the first feature group $G_0$, dx and dy represent the relative-position relationship between the sixth group of features $F_5$ and the first feature group $G_0$, Union Display $(A_1, DF_1)$ is a union set of the first display area $A_1$ and the sixth feature image $DF_5$ (i.e. the sixth feature image $DF_5$ is displayed on the first display area $A_1$), and $G_0=G_0 \cup F_5$ indicates that the sixth group of features $F_5$ is incorporated into the first feature group $G_0$.

Figure 4A:
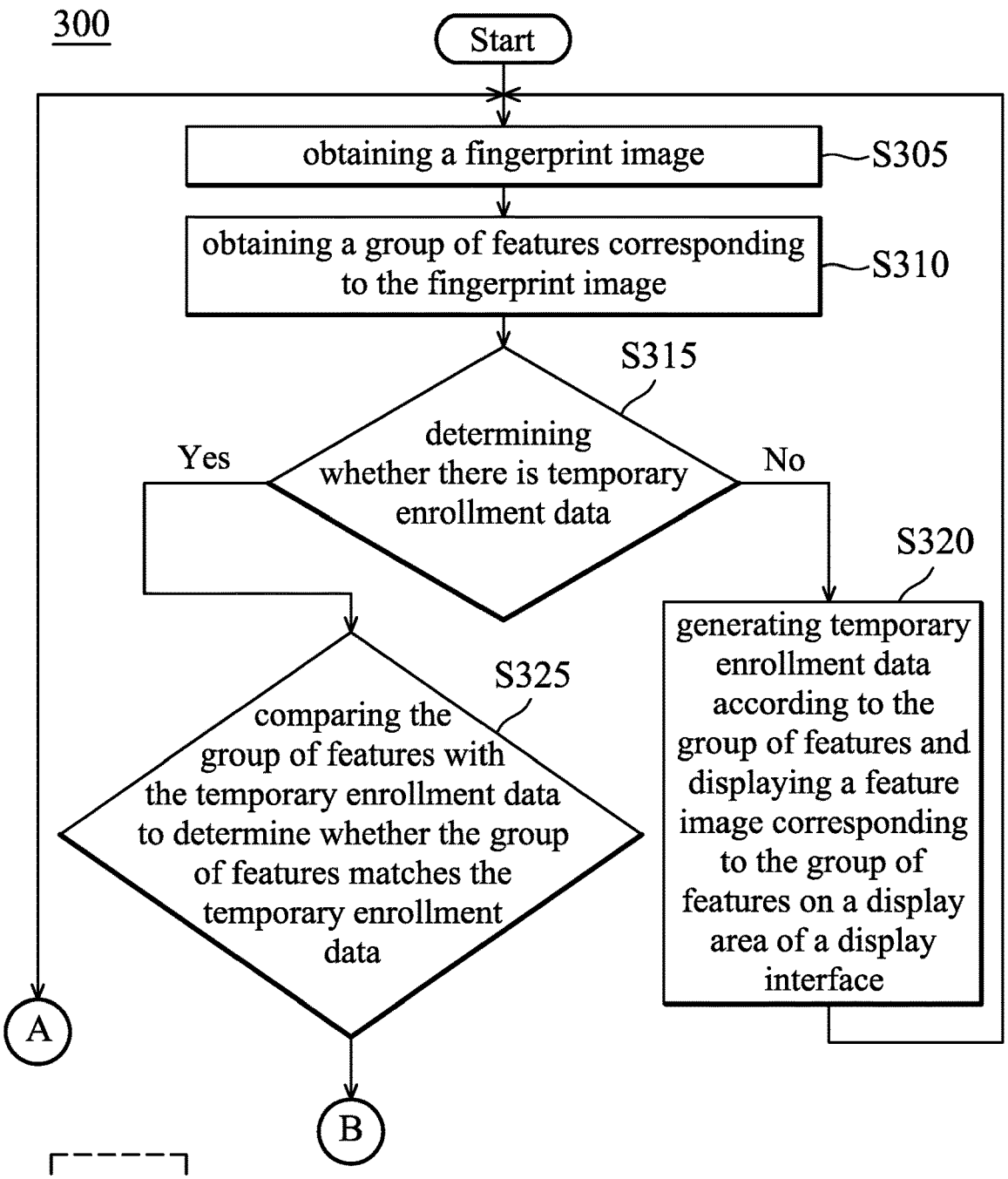
FIGS. 4A-4B represent a flow chart 300 illustrating a fingerprint enrollment method according to an embodiment of the invention.
Figure 4B:
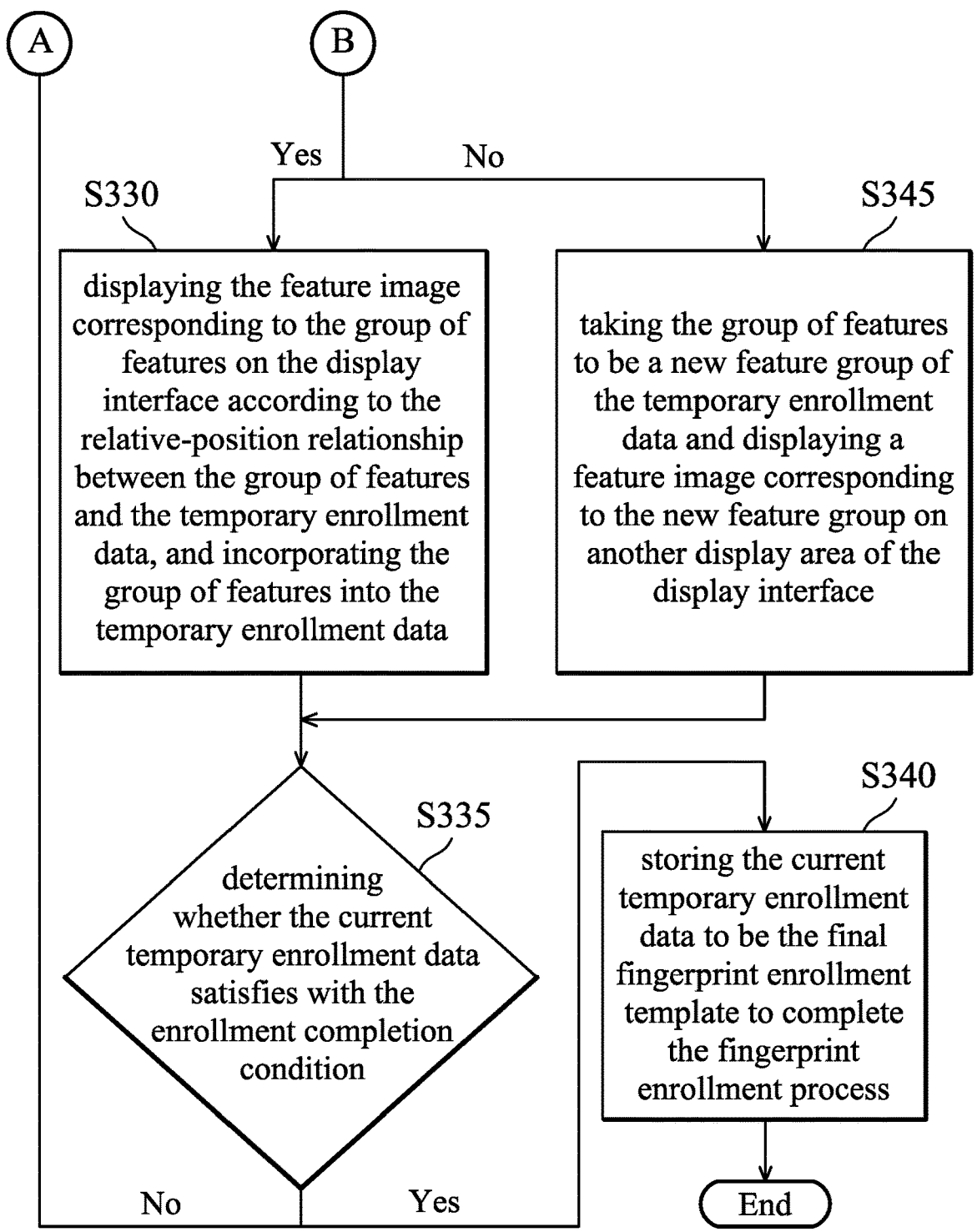

FIGS. 4A-4B represent a flow chart 300 illustrating a fingerprint enrollment method according to an embodiment of the invention. The fingerprint enrollment method is applied to an electronic device 100. As shown in FIGS. 4A-4B, in step S305, the electronic device 100 may obtain a fingerprint image. In step S310, the electronic device 100 may obtain a group of features corresponding to the fingerprint image. In step S315, the electronic device 100 may determine whether there is temporary enrollment data in the storage device 140.

When there is no temporary enrollment data in the storage device 140, step S320 is performed. In step S320, the electronic device 100 generates temporary enrollment data according to the group of features and displays a feature image corresponding to the group of features on a display area of a display interface.

When there is temporary enrollment data in the storage device 140, step S325 is performed. In step S325, the electronic device 100 compares the group of features with the temporary enrollment data to determine whether the group of features matches the temporary enrollment data.

When the group of features matches the temporary enrollment data, step S330 is performed. In step S330, the electronic device 100 displays the feature image corresponding to the group of features on the display interface according to the relative-position relationship between the group of features and the temporary enrollment data, and incorporates the group of features into the temporary enrollment data. Then, in step S335, the electronic device 100 determines whether the current temporary enrollment data satisfies with the enrollment completion condition. When the current temporary enrollment data satisfies with the enrollment completion condition, step S340 is performed. In step S340, the electronic device 100 may store (take) the current temporary enrollment data to be the final fingerprint enrollment template to complete the fingerprint enrollment process. When the current temporary enrollment data does not satisfy with the enrollment completion condition, the fingerprint enrollment method goes back to step S305.

When the group of features does not match the temporary enrollment data, step S345 is performed. In step S345, the electronic device 100 take the group of features to be a new feature group of the temporary enrollment data and display a feature image corresponding to the new feature group on another display area of the display interface. Then, the fingerprint enrollment method goes back to step S335 and the following steps are performed.

Figure 5:
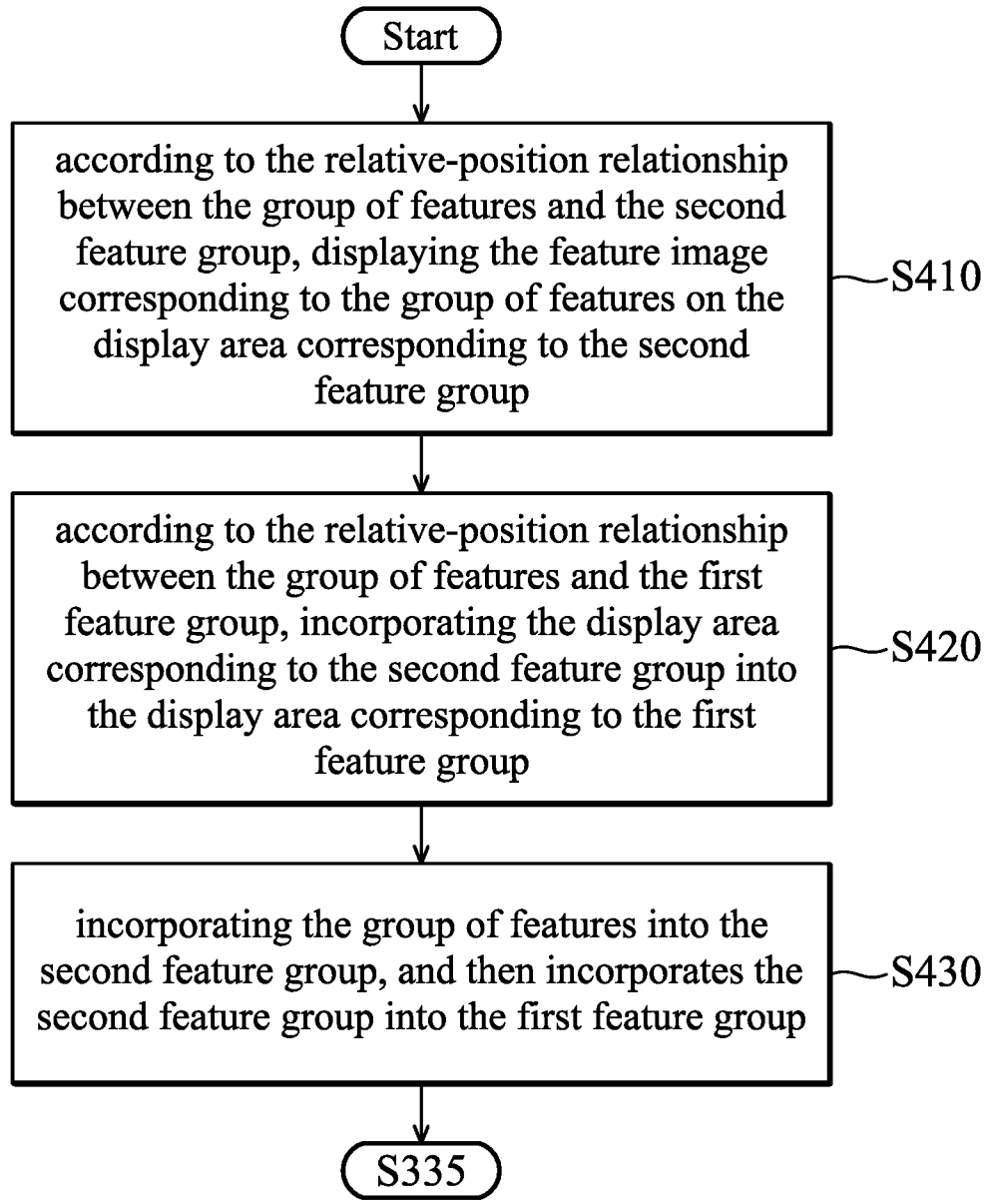
FIG. 5 is a flow chart 400 illustrating a fingerprint enrollment method according to an embodiment of the invention.

FIG. 5 is a flow chart 400 illustrating a fingerprint enrollment method according to an embodiment of the invention. The fingerprint enrollment method is applied to an electronic device 100. In step S330, when the group of features matches the first feature group and the second feature group of the temporary enrollment data at the same time, the electronic device 100 may perform the following steps. In step S410, according to the relative-position relationship between the group of features and the second feature group, the electronic device 100 displays the feature image corresponding to the group of features on the display area (e.g. second display area) corresponding to the second feature group. In step S420, according to the relative-position relationship between the group of features and the first feature group, the electronic device 100 incorporates the display area (e.g. second display area) corresponding to the second feature group into the display area (e.g. first display area) corresponding to the first feature group. In step S430, the electronic device 100 incorporates the group of features into the second feature group, and then incorporates the second feature group into the first feature group.

Figure 6:
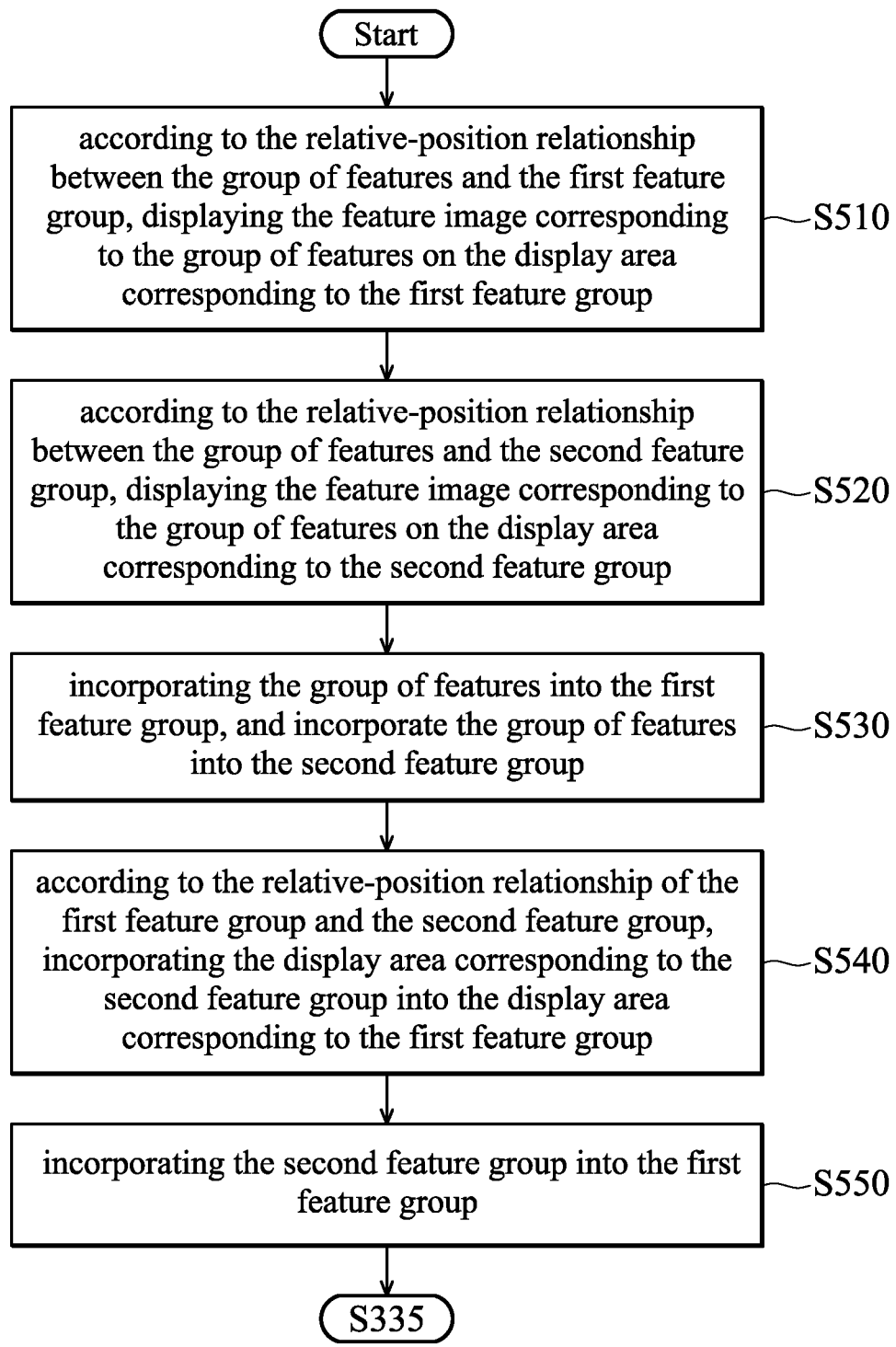
FIG. 6 is a flow chart 500 illustrating a fingerprint enrollment method according to another embodiment of the invention.

FIG. 6 is a flow chart 500 illustrating a fingerprint enrollment method according to another embodiment of the invention. The fingerprint enrollment method is applied to an electronic device 100. In step S330, when the group of features matches the first feature group and the second feature group of the temporary enrollment data at the same time, the electronic device 100 may perform the following steps. In step S510, according to the relative-position relationship between the group of features and the first feature group, the electronic device 100 displays the feature image corresponding to the group of features on the display area (e.g. first display area) corresponding to the first feature group. In step S520, according to the relative-position relationship between the group of features and the second feature group, the electronic device 100 displays the feature image corresponding to the group of features on the display area (e.g. second display area) corresponding to the second feature group. In step S530, the electronic device 100 may incorporate the group of features into the first feature group, and incorporate the group of features into the second feature group. In step S540, according to the relative-position relationship of the first feature group and the second feature group, the electronic device 100 incorporates the display area corresponding to the second feature group into the display area corresponding to the first feature group. In step S550, electronic device 100 incorporates the second feature group into the first feature group.

According to the fingerprint enrollment method provided in the invention, the user can know the current fingerprint enrollment progress in real time according to the display information (i.e. the accumulated coverage of the display areas) on the display interface. In addition, when the user is requested to put his or her finger on the fingerprint sensor to enroll his or her fingerprint, the user can adjust the portion of his or her finger putting on the fingerprint sensor in order to increase the coverage of the fingerprint enrollment template.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiments, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint enrollment method, applied to generate a fingerprint enrollment template, the method comprising:
   obtaining a fingerprint image;
   obtaining a group of features corresponding to the fingerprint image;
   determining whether there is temporary enrollment data;
   when there is no temporary enrollment data, generating the temporary enrollment data according to the group of features and displaying a feature image corresponding to the group of features on a display interface;
   when there is the temporary enrollment data, according to a relative-position relationship between the group of features and the temporary enrollment data, displaying the feature image corresponding to the group of features on the display interface, and incorporating the group of features into the temporary enrollment data;
   determining whether the temporary enrollment data satisfying with an enrollment completion condition; and
   when the temporary enrollment data satisfying with the enrollment completion condition, storing the temporary enrollment data to be the fingerprint enrollment template to complete fingerprint enrollment.

2. The fingerprint enrollment method of claim 1, further comprising:
   when there is no temporary enrollment data, generating a first feature group of the temporary enrollment data according to the group of features; and
   displaying the feature image corresponding to the first feature group on a first display area of the display interface.

3. The fingerprint enrollment method of claim 2, further comprising:
   when there is the temporary enrollment data and the group of features does not match the first feature group of the temporary enrollment data, taking the group of features to be a second feature group of the temporary enrollment data; and
   displaying the feature image corresponding to the second feature group on a second display area of the display interface,
   wherein the first display area does not overlap the second display area.

4. The fingerprint enrollment method of claim 3, further comprising:
   when the group of features matches the first feature group of the temporary enrollment data, according to the relative-position relationship between the group of features and the first feature group, displaying the feature image corresponding to the group of features on the first display area; and
   incorporating the group of features into the first feature group.

5. The fingerprint enrollment method of claim 3, further comprising:
   when the group of features matches the first feature group of the temporary enrollment data and a second feature group of the temporary enrollment data, displaying the feature image corresponding to the group of features on the second display area according to the relative-position relationship between the group of features and the second feature group;
   according to the relative-position relationship between the group of features and the first feature group, incorporating the second display area into the first display area; and after incorporating the group of features into the second feature group, incorporating the second feature group into the first feature group.

6. The fingerprint enrollment method of claim 3, further comprising:
when the group of features matches the first feature group of the temporary enrollment data and matches a second feature group of the temporary enrollment data, displaying the feature image corresponding to the group of features on the first display area according to the relative-position relationship between the group of features and the first feature group;
according to the relative-position relationship between the group of features and the second feature group, displaying the feature image corresponding to the group of features on the second display area;
incorporating the group of features into the first feature group and also incorporating the group of features into the second feature group;
according to the relative-position relationship between the first feature group and the second feature group, incorporating the second display area into the first display area; and
incorporating the second feature group into the first feature group.

7. The fingerprint enrollment method of claim 3, further comprising:
when the group of features does not match the first feature group and does not match the second feature group, taking the group of features to be a third feature group of the temporary enrollment data; and
displaying the feature image corresponding to the third feature group on a third display area of the display interface,
wherein the first display area, the second display area and the third display area do not overlap each other.

8. The fingerprint enrollment method of claim 1, wherein the display interface comprises a reference fingerprint image and the feature image is displayed on the reference fingerprint image.

9. The fingerprint enrollment method of claim 8, further comprising:
when there is no temporary enrollment data, generating the temporary enrollment data according to the group of features; and
displaying the feature image corresponding to the group of features on a central position of the reference fingerprint image.

10. The fingerprint enrollment method of claim 1, wherein the enrollment completion condition is that the number of features in the temporary enrollment data, a data quantity, a coverage area, a width or a height of the temporary enrollment data is greater than a predetermined threshold.

11. An electronic device, applied to generate a fingerprint enrollment template, the electronic device comprising:
a display device, comprising a display interface;
a fingerprint sensor, obtaining a plurality of fingerprint images;
a processor, coupled to the display device and the fingerprint sensor, obtaining a plurality of groups of features corresponding to the plurality of fingerprint images and according to the plurality of groups of features, generating temporary enrollment data; and
a storage device, storing the fingerprint enrollment template;
wherein the processor performs the following steps:
obtaining a fingerprint image;
obtaining a group of features corresponding to the fingerprint image;
determining whether there is temporary enrollment data;
when there is no temporary enrollment data, generating the temporary enrollment data according to the group of features and displaying a feature image corresponding to the group of features on the display interface;
when there is the temporary enrollment data, according to a relative-position relationship between the group of features and the temporary enrollment data, displaying the feature image corresponding to the group of features on the display interface, and incorporating the group of features into the temporary enrollment data;
determining whether the temporary enrollment data satisfying with an enrollment completion condition; and
when the temporary enrollment data satisfying with the enrollment completion condition, storing the temporary enrollment data to be the fingerprint enrollment template to complete fingerprint enrollment.

12. The electronic device of claim 11, wherein when there is no temporary enrollment data, the processor generates a first feature group of the temporary enrollment data according to the group of features, and displays the feature image corresponding to the first feature group on a first display area of the display interface.

13. The electronic device of claim 12, wherein when there is the temporary enrollment data, and the group of features does not match the first feature group of the temporary enrollment data, the processor takes the group of features to be a second feature group of the temporary enrollment data, and displays the feature image corresponding to the second feature group on a second display area of the display interface, wherein the first display area does not overlap the second display area.

14. The electronic device of claim 13, wherein when the group of features matches the first feature group of the temporary enrollment data, according to the relative-position relationship between the group of features and the first feature group, the processor displays the feature image corresponding to the group of features on the first display area, and incorporates the group of features into the first feature group.

15. The electronic device of claim 13, wherein when the group of features matches the first feature group of the temporary enrollment data and matches a second feature group of the temporary enrollment data, according to the relative-position relationship between the group of features and the second feature group, the processor displays the feature image corresponding to the group of features on the second display area and according to the relative-position relationship between the group of features and the first feature group, incorporates the second display area into the first display area, and after incorporating the group of features into the second feature group, the processor incorporates the second feature group into the first feature group.

16. The electronic device of claim 13, wherein when the group of features matches the first feature group of the temporary enrollment data and matches a second feature group of the temporary enrollment data, the processor displays the feature image corresponding to the group of features on the first display area according to the relative-position relationship between the group of features and the first feature group and displays the feature image corresponding to the group of features on the second display area according to the relative-position relationship between the group of features and the second feature group, and the processor incorporates the group of features into the first feature group and also incorporating the group of features into the second feature group, and the processor incorporates the second display area into the first display area according to the relative-position relationship between the first feature group and the second feature group and incorporates the second feature group into the first feature group.

17. The electronic device of claim 13, wherein when the group of features does not match with the first feature group and does not match with the second feature group, the processor takes the group of features to be a third feature group of the temporary enrollment data, and displays the feature image corresponding to the third feature group on a third display area of the display interface, wherein the first display area, the second display area and the third display area do not overlap each other.

18. The electronic device of claim 11, wherein the display interface comprises a reference fingerprint image and the feature image is displayed on the reference fingerprint image.

19. The electronic device of claim 18, wherein when there is no any temporary enrollment data, the processor generates the temporary enrollment data according to the group of features, and displays the feature image corresponding to the group of features on a central position of the reference fingerprint image.

20. The electronic device of claim 11, wherein the enrollment completion condition is that the number of features in the temporary enrollment data, a data quantity, a coverage area, a width or a height of the temporary enrollment data is greater than a predetermined threshold.

* * * * *